US008907976B2

(12) United States Patent
Schmidt

(10) Patent No.: US 8,907,976 B2
(45) Date of Patent: Dec. 9, 2014

(54) RESOLUTION-ADAPTIVE MESH SMOOTHING BRUSH

(75) Inventor: Ryan Michael Schmidt, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 260 days.

(21) Appl. No.: 13/425,359

(22) Filed: Mar. 20, 2012

(65) Prior Publication Data

US 2013/0249912 A1 Sep. 26, 2013

(51) Int. Cl.
*G09G 5/00* (2006.01)
(52) U.S. Cl.
USPC ............................. 345/611; 345/423; 345/419
(58) Field of Classification Search
CPC ................ G06T 17/00; G06T 2200/12; G06T 2219/2021; G06T 11/203; G06T 15/503; G06T 5/00
USPC ......... 345/611, 441, 420, 423, 428, 606, 643, 345/419
See application file for complete search history.

(56) References Cited

U.S. PATENT DOCUMENTS

| 5,892,691 A * | 4/1999 | Fowler .............................. 703/6 |
| 6,271,856 B1 * | 8/2001 | Krishnamurthy ............. 345/581 |
| 2007/0030268 A1 * | 2/2007 | Nigro ............................. 345/420 |

OTHER PUBLICATIONS

Kil YJ, Renzulli P, Kreylos O, Hamann B, Monno G, Staadt O, "3D warp brush modeling," Computer & Graphics, vol. 30, Issue 4, Aug. 2006, pp. 610-618.*

* cited by examiner

*Primary Examiner* — Maurice L McDowell, Jr.
(74) *Attorney, Agent, or Firm* — Patterson & Sheridan, LLP

(57) ABSTRACT

A system and method are disclosed for implementing a resolution-adaptive mesh smoothing brush. The resolution-adaptive mesh smoothing brush computes updated positions of vertices of a 3D mesh based on vertex density of the polygons defining the 3D mesh. The resolution-adaptive mesh smoothing brush effectively controls the "rate" of smoothing based on the local mesh density at each vertex. Therefore, areas of the 3D mesh with varying vertex density are smoothed. For example, elevated bumps or dimples on a sphere may be smoothed to lay on the surface of the sphere while the sphere shape is retained.

19 Claims, 10 Drawing Sheets

RESOLUTION-ADAPTIVE MESH SMOOTHING BRUSH

BACKGROUND

1. Technical Field

The present disclosure relates generally to computer-aided design (CAD) and, more specifically, to a resolution-adaptive mesh smoothing brush used to edit a three-dimensional (3D) object.

2. Description of the Related Art

Many CAD programs, such as 3D surface-sculpting systems allow a user to edit a 3D object using a set of brushes, which are metaphorically similar to paint-brush tools used in an image editor such as Adobe® Photoshop®. A 3D brush has an area-of-application, i.e., the area of the 3D object within the boundary of the 3D brush, and applies some operation within the area. In addition to performing painting operations, 3D brushes may also be used to modify the shape of the 3D object.

One conventional type of 3D brush is the smoothing brush, which smoothes out details in the underlying surface by changing positions of vertices of a mesh that represents the 3D object. The effect of the conventional smoothing brush is based on the assumption that the underlying polygons of the 3D mesh have a near-uniform distribution of vertices (i.e., that the lengths of edges in the mesh are all similar). When the 3D mesh contains areas of higher vertex density and lower vertex density, the conventional smoothing brush has a limited ability to converge to a truly smooth surface.

Therefore, what is needed in the art is new techniques for computing updated positions of vertices of a 3D mesh when a smoothing brush is applied to the 3D mesh.

SUMMARY

The present invention generally provides a system and method for implementing a resolution-adaptive mesh smoothing brush. The resolution-adaptive mesh smoothing brush computes updated positions of vertices of a 3D mesh based on vertex density of the polygons of the 3D mesh. The resolution-adaptive mesh smoothing brush effectively controls the "rate" of smoothing based on the local mesh density at each vertex.

One example embodiment of the present disclosure sets forth a method for smoothing a three-dimensional (3D) mesh. The method includes the step of identifying a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush. First, a dynamic smoothing rate parameter, based on the vertex density that is local to the vertex, is computed for each vertex in the set of vertices. Then a position associated with the vertex is updated according to the dynamic smoothing rate parameter computed for the vertex.

Another example embodiment of the present disclosure sets forth a computer readable storage medium containing a program for smoothing a three-dimensional (3D) mesh, which, when executed by a processing unit, cause a computer system to perform an operation comprising identifying a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush. First, a dynamic smoothing rate parameter, based on the vertex density that is local to the vertex, is computed for each vertex in the set of vertices. Then a position associated with the vertex is updated according to the dynamic smoothing rate parameter computed for the vertex.

Yet another example embodiment of the present disclosure sets forth a computing system configured to smooth a three-dimensional (3D) mesh. The system includes a memory coupled to the processor, where the memory includes an application program that includes instructions that, when executed by the processor, cause the processor to identify a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush. Then processor then computes a dynamic smoothing rate parameter for each vertex in the set of vertices, based on the vertex density that is local to the vertex and updates a position of the vertex according to the dynamic smoothing rate parameter.

One advantage of the disclosed approach is that the resolution-adaptive mesh smoothing brush can be applied to a 3D mesh to smooth the mesh in real-time based on the local vertex resolution. Vertices in areas of the 3D mesh with bumps or dimples are repositioned to produce a more uniform or smooth surface. The smoothing operation is interactive from the user's point of view since the modification to vertex positions is immediate and can be seen by the user.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1A:
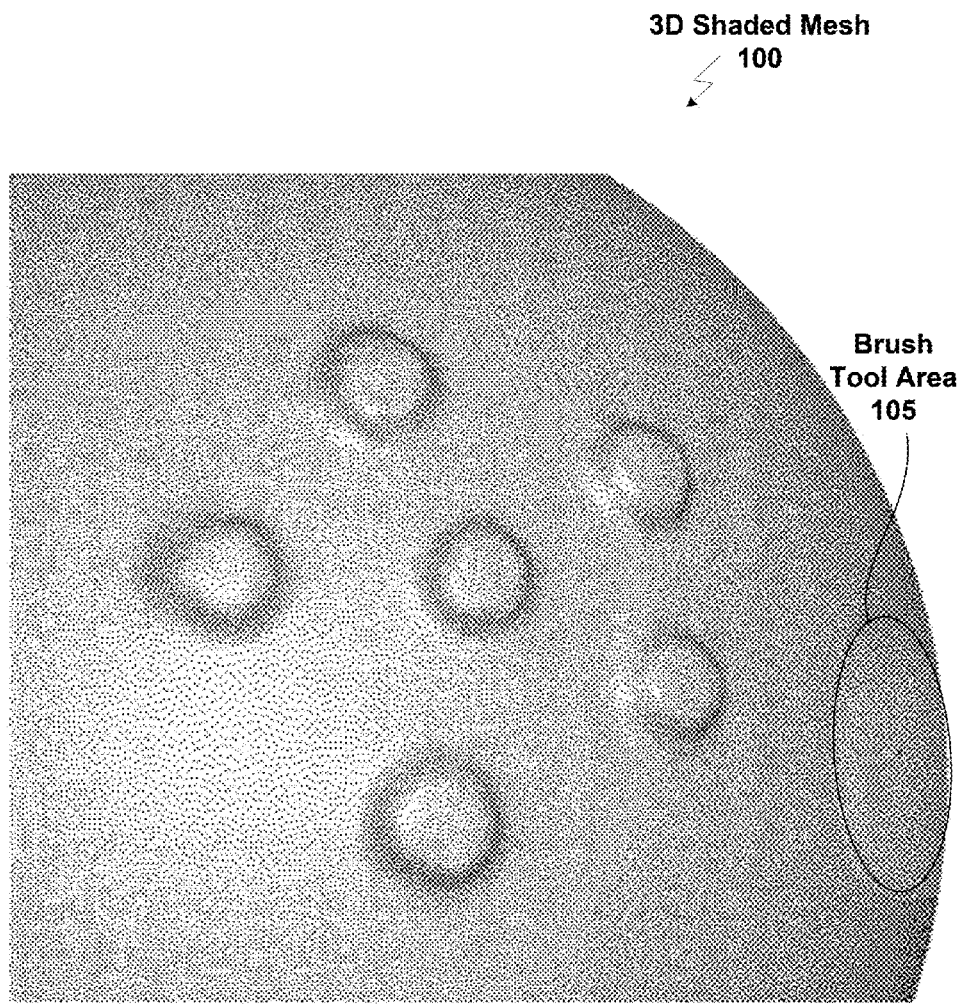
FIG. 1A illustrates a three-dimensional shaded mesh defined by vertices, according to the prior art.

FIG. 1A illustrates a 3D shaded mesh 100 defined by vertices, according to the prior art. The brush tool area 105 is shown although the smoothing brush has not been applied to the 3D shaded mesh 100. Originally, the 3D shaded mesh 100 is a sphere defined by a low-resolution mesh. Then higher-resolution details (6 small bumps) are added.

Figure 1B:
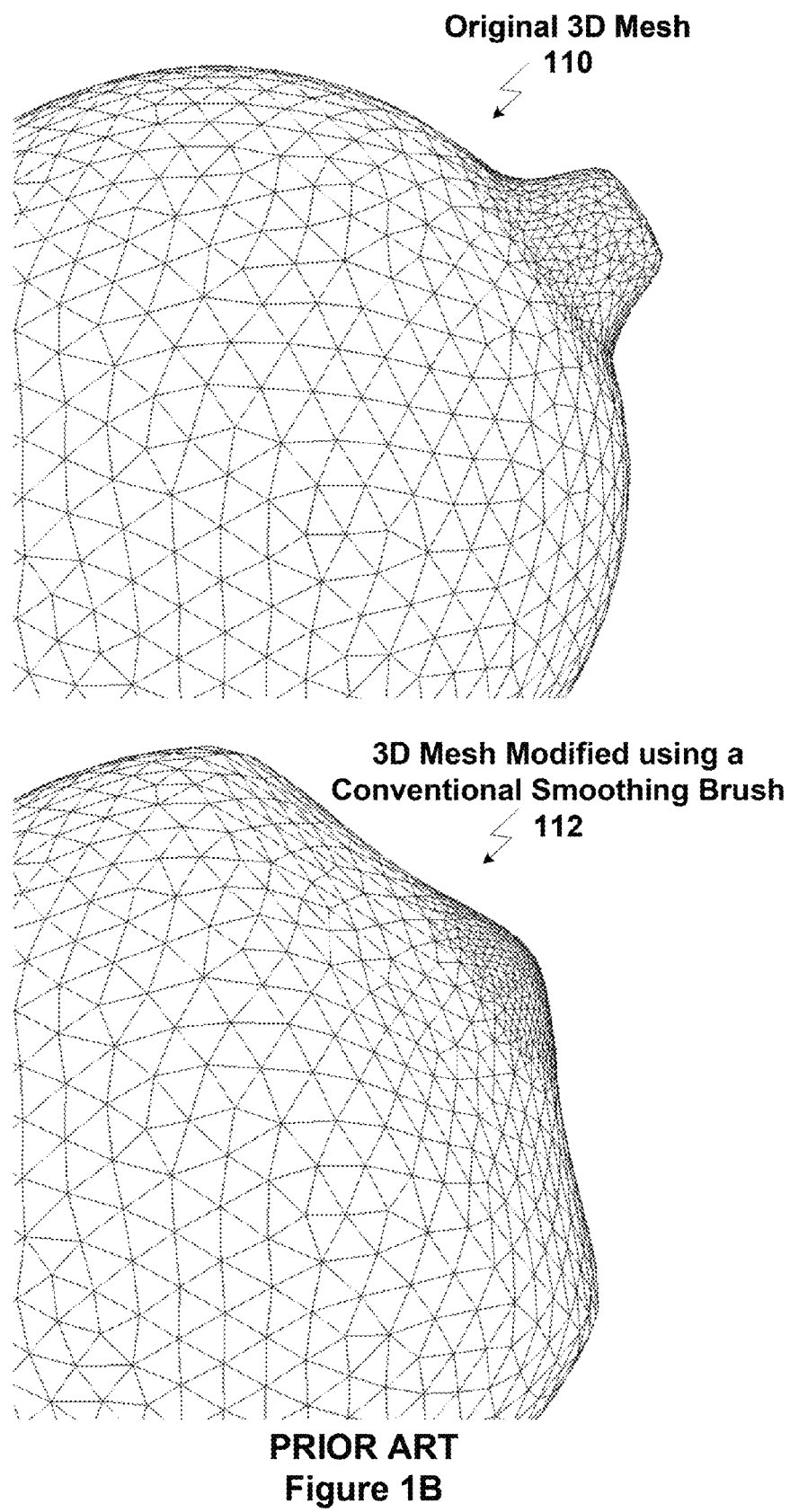
FIG. 1B illustrates a view of vertices of a 3D mesh before and after being modified using a conventional smoothing brush, according to the prior art.

FIG. 1B illustrates a view of vertices of a 3D mesh before and after being modified using a conventional smoothing brush, according to the prior art. As shown in FIG. 1B, the vertex density is higher where the bump appears on the surface of the 3D mesh. The original 3D mesh 110 is modified using the conventional smoothing brush to produce the 3D mesh modified using a conventional smoothing brush 112. Although the bump has been smoothed onto the sphere for the 3D mesh modified using a conventional smoothing brush 212, the sphere itself has been flattened compared with the original 3D shaded mesh 110. The intent of the user was to flatten the bump onto the sphere while minimizing flattening of the sphere itself.

Figure 1C:
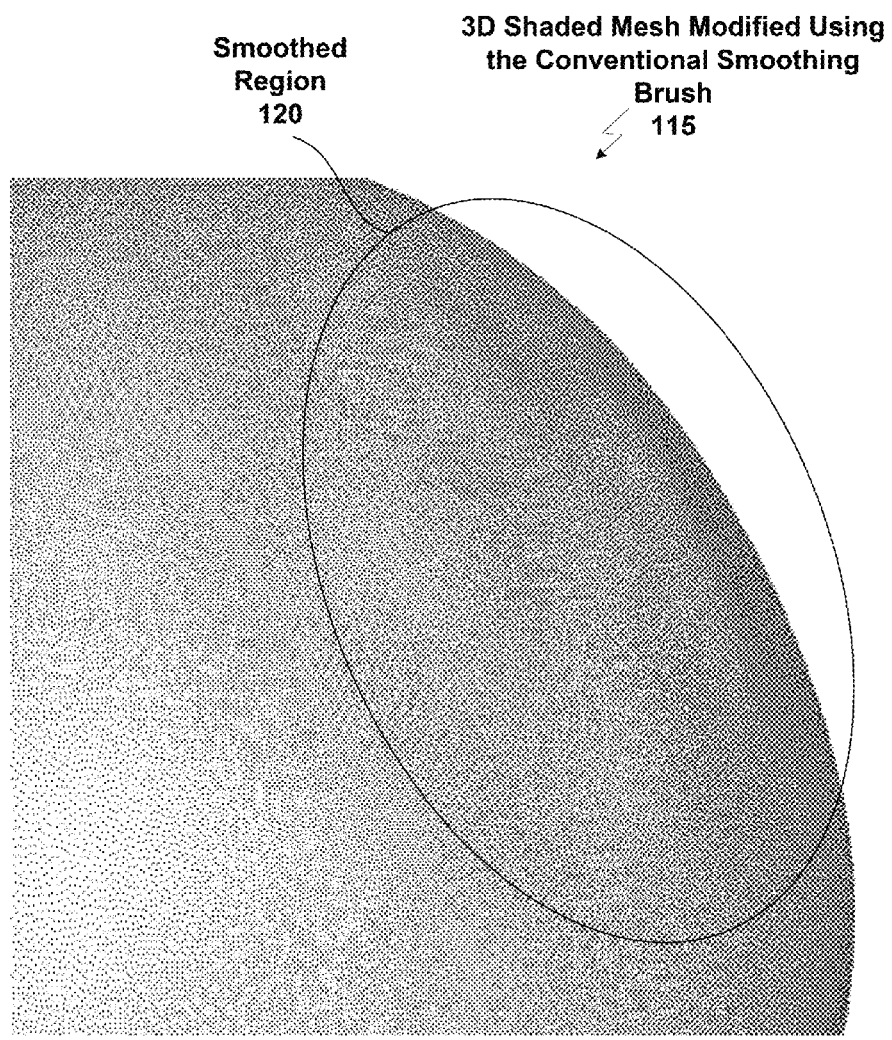
FIG. 1C illustrates a first view of the three-dimensional mesh shaded mesh of FIG. 1A modified using a conventional smoothing brush, according to the prior art.

FIG. 1C illustrates a first view of the 3D shaded mesh of FIG. 1A modified using a conventional smoothing brush, according to the prior art. The smoothed region 120 of the 3D shaded mesh modified using the conventional smoothing brush 115 was modified using a conventional smoothing brush. The type of smoothing used within the smoothed region 120 is referred to as Laplacian smoothing. Although the small bumps within the smoothed region 120 have been smoothed, the small bumps are still visible.

Figure 1D:
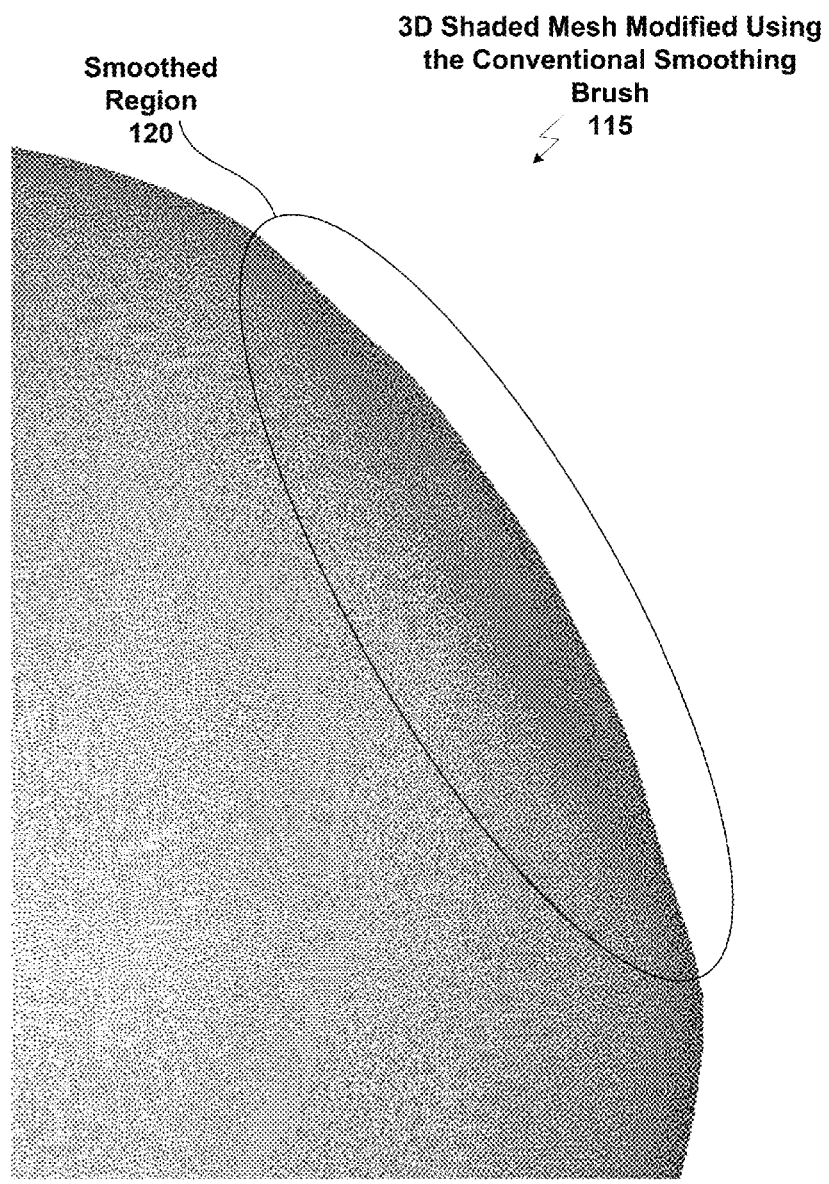
FIG. 1D illustrates a second view of the three-dimensional mesh shaded mesh of FIG. 1A modified using the conventional smoothing brush, according to the prior art.

Furthermore, as is evident looking at the modified 3D shaded mesh from a different viewpoint, the sphere has been significantly flattened. FIG. 1D illustrates a second view of the three-dimensional mesh shaded mesh of FIG. 1A modified using the conventional smoothing brush, according to the prior art. Additional application of the smoothing brush serves only to increasingly flatten out the sphere, the small bumps will remain slightly visible.

The mathematical mechanism behind the resolution-adaptive smoothing brush is to modify the position of the vertices based on a fixed parameter k. As a result, the vertices in areas of lower vertex density (areas that do not include the small bumps) will move by a larger amount compared with vertices in areas of higher vertex density (areas that include the small bumps).

Figure 1E:
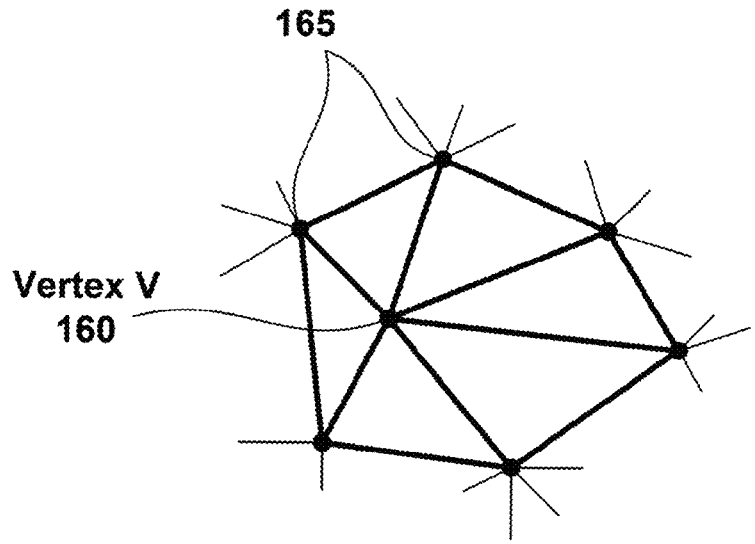
FIG. 1E illustrates a vertex of a three-dimensional mesh and one-ring of the vertex, according to the prior art.

FIG. 1E illustrates a vertex 160 of a 3D mesh and one-ring of the vertex 165, according to the prior art. For each vertex V 160 of the mesh, the set of vertices directly connected to the vertex by an edge is identified. The set of vertices is known as the one-ring of the vertex V 165. The one-ring of the vertex 165 includes six vertices that are each connected to the vertex V 160 by an edge. Then the weighted-sum of the positions of the neighbor vertices in the one-ring of the vertex 165 is computed. Uniform weights are used to compute the weighted one-ring sum, V'. For example, if there are N vertices in the one-ring of the vertex, a weight of 1/N is assigned to each vertex in the one-ring of the vertex. For the one-ring of the vertex 165 each vertex is assigned a weight of 1/6.

A difference vector, v, is computed as the difference between the weighted-sum V' and the vertex V, i.e., v=(V'−V). The new position of the vertex V 160 is computed as (V+k*v), where the parameter k is a fixed parameter that controls the rate of smoothing, and k is set to a constant value in the range [0,1]. The computations of V' and v may be iterated to produce an increasingly-smooth mesh.

Figure 1F:
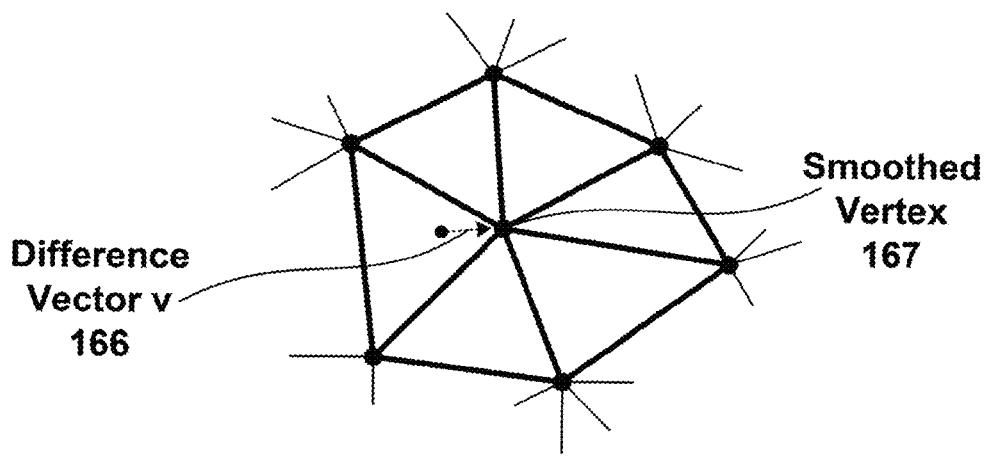
FIG. 1F illustrates the vertex of FIG. 1E modified using the conventional smoothing brush to produce a smoothed vertex, according to the prior art.

FIG. 1F illustrates the vertex V 160 of FIG. 1E modified using the conventional smoothing brush to produce a smoothed vertex 167, according to the prior art. The difference vector v 166 is computed and the vertex V 160 is moved according to the difference vector v 166 to produce the smoothed vertex 167.

The limitation of this conventional approach as described thus far is that the distance a vertex V can move in a single smoothing step—the maximum length of the vector v—is dependent on the lengths of the edges connected to V. When a region with high vertex density is smoothed simultaneously with a region of lower vertex density, with a fixed parameter k, the vertices in an area of lower vertex density will take larger steps compared with the vertices in an area of higher vertex density. The effect of the conventional smoothing brush is based on the assumption that the underlying polygons of the 3D mesh have a near-uniform distribution of vertices (i.e., that the lengths of edges in the mesh are all similar). When the 3D mesh contains areas of higher vertex density and lower vertex density, the conventional smoothing brush has a limited ability to converge to a truly smooth surface.

Figure 2A:
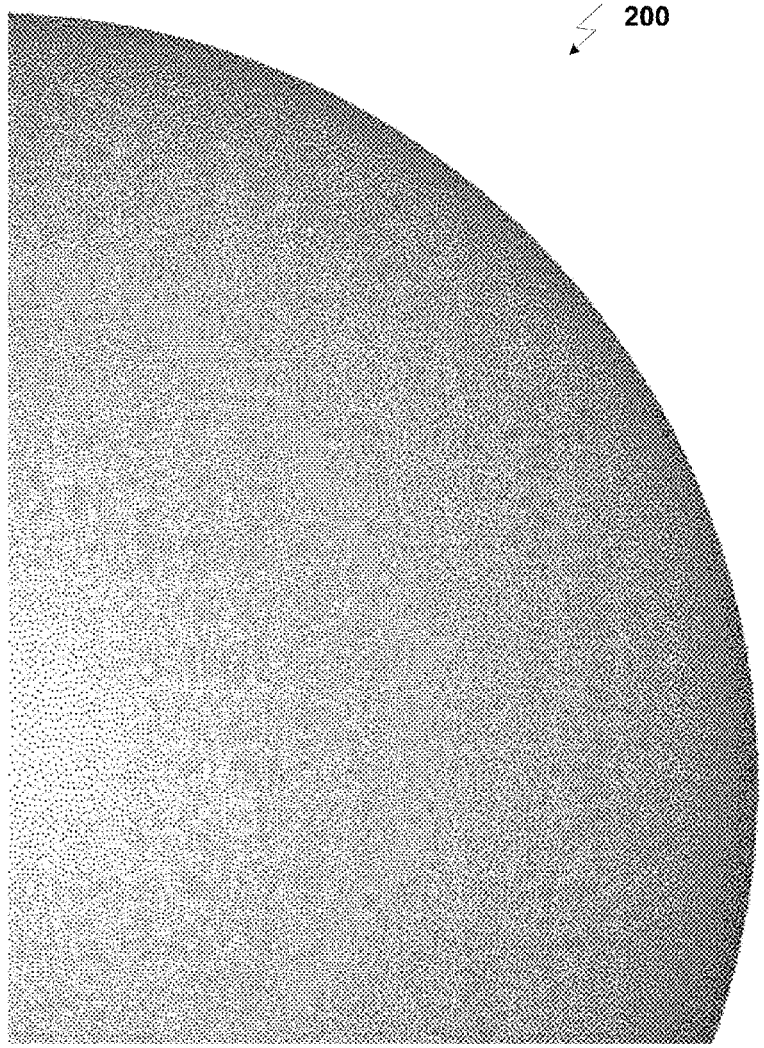
FIG. 2A illustrates a first view of the three-dimensional shaded mesh of FIG. 1A modified using an resolution-adaptive mesh smoothing brush, according to one example embodiment of the present disclosure.

FIG. 2A illustrates a first view of the three-dimensional shaded mesh of FIG. 1A modified using a resolution-adaptive mesh smoothing brush, according to one example embodiment of the present disclosure. The 3D shaded mesh modified using the resolution-adaptive mesh smoothing brush 200 corresponds to the 3D shaded mesh modified using the conventional smoothing brush 115 shown in FIG. 1C. Note, that the small bumps seen in the 3D shaded mesh modified using the conventional smoothing brush 115 are not visible in the 3D shaded mesh modified using the resolution-adaptive mesh smoothing brush 200.

Figure 2B:
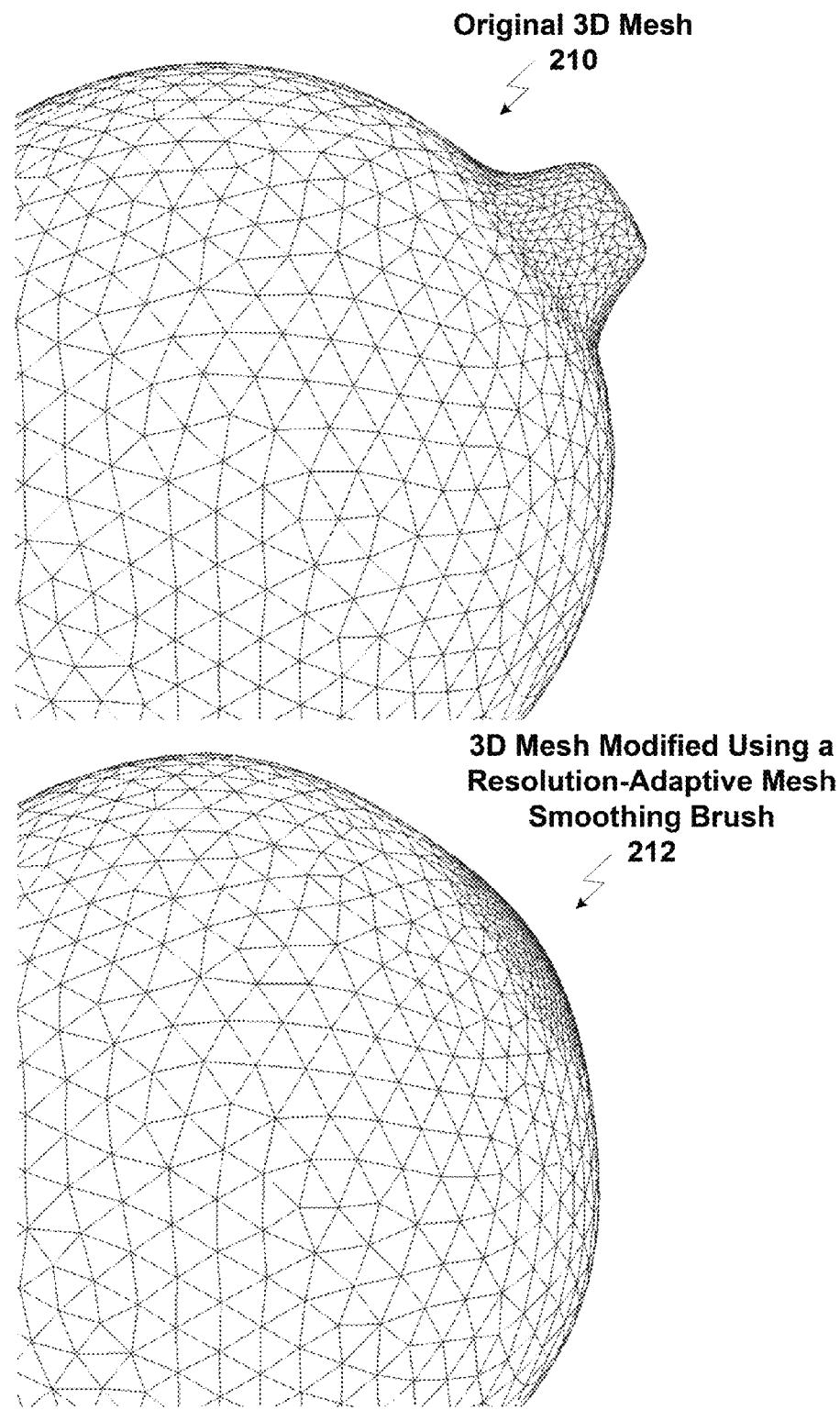
FIG. 2B illustrates a view of vertices of a 3D mesh before and after being modified using a resolution-adaptive mesh smoothing brush, according to one example embodiment of the present disclosure.

FIG. 2B illustrates a view of vertices of a 3D mesh before and after being modified using a resolution-adaptive mesh smoothing brush, according to one example embodiment of the present disclosure. As shown in FIG. 2B, the vertex density is higher where the bump appears on the surface of the 3D mesh. The original 3D mesh 210 is modified using the resolution-adaptive mesh smoothing brush to produce the 3D mesh modified using a resolution-adaptive mesh smoothing brush 212. The bump has been completely flattened onto the sphere for the 3D mesh modified using a resolution-adaptive mesh smoothing brush 212. However, the sphere has not been flattened compared with the 3D shaded mesh modified using the conventional smoothing brush 112 of FIG. 1D.

To achieve resolution-adaptive smoothing, the smoothing rate parameter k is in the range [0,1] and is dynamic, i.e., modulated at each vertex based on the vertex density of the local mesh. In contrast, conventional smoothing is performed using a constant value for the parameter k. More specifically, when resolution-adaptive smoothing is performed, k is computed based on a re-scaled area-weight for each vertex. The re-scaled area-weight is computed based on a normalized area of the local mesh for each vertex, as described further herein. The normalized area accounts for differences in vertex density.

The dynamic smoothing rate parameter k that is computed for each vertex is computed based on a falloff function defined for brush operations, a fixed k value ($k_{smooth}$), and a re-scaled area-weight for the vertex. The value $k_{smooth}$ is a fixed global smoothing speed in the range [0,1] that may be specified for all smoothing operations or $k_{smooth}$ may be specified for each smoothing brush. The falloff function is a scalar function with the vertex position as an input. The falloff function may be specified for each smoothing brush. Generally, a smoothing brush incorporates a falloff function which defines how strongly the smoothing brush operation affects each vertex, with the falloff decreasing away from the center of the smoothing brush. In other words, the falloff function represents a filter that is applied by the smoothing brush. A user may initiate a command using a toolbar to specify a radius or diameter of the resolution-adaptive mesh smoothing brush, a falloff function of the resolution-adaptive mesh smoothing brush, and/or $k_{smooth}$ of the resolution-adaptive mesh smoothing brush.

In one embodiment, a user controls an input device, e.g., mouse, stylus, or the like, to position the resolution-adaptive mesh smoothing brush over a region of the 3D mesh to smooth the region. The application program causes a graphical representation of the resolution-adaptive mesh smoothing brush to be displayed. The 3D mesh is also displayed. The application program also updates the display as positions of the vertices are updated when the user applies the resolution-adaptive mesh smoothing brush to the 3D mesh to display the smoothed 3D mesh.

Figure 3A:
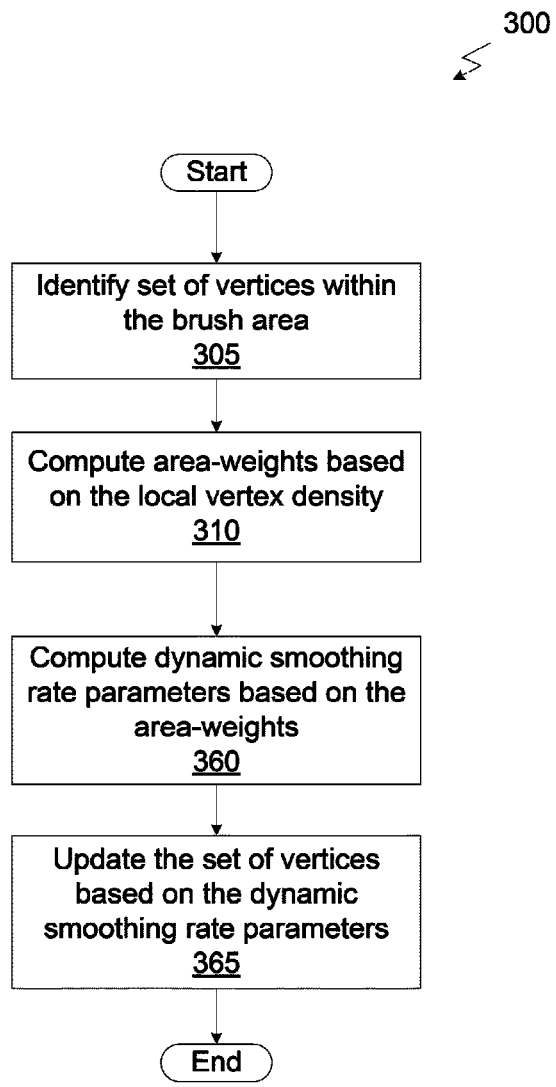
FIG. 3A is a flowchart of method steps for smoothing vertices of a 3D mesh using a resolution-adaptive mesh smoothing brush, according to one example embodiment of the present disclosure.

FIG. 3A is a flowchart of method steps 300 for smoothing vertices of a 3D mesh using a resolution-adaptive mesh smoothing brush, according to one example embodiment of the present disclosure. Persons skilled in the art will understand that any system configured to perform the method steps, in any order, is within the scope of the disclosure.

The method begins at step 305, where an application program configured to provide the resolution-adaptive mesh smoothing brush identifies a set of vertices within an area of a 3D mesh that is operated on by a resolution-adaptive mesh smoothing brush. In one embodiment, the area of the 3D mesh is the size of the resolution-adaptive mesh smoothing brush. At step 310, the application program computes area-weights based on the vertex density that is local to each vertex in the set of vertices. At step 360 the application program computes a dynamic smoothing rate parameter for each vertex based on the area-weight computed for the vertex in step 310. At step 365 the application program smoothes the 3D mesh by updating a position of each vertex in the set of vertices according to the dynamic smoothing rate parameter computed for the respective vertex. Steps 305, 310, 360, and 365 may be repeated for each movement of the resolution-adaptive mesh smoothing brush over the 3D mesh.

Figure 3B:
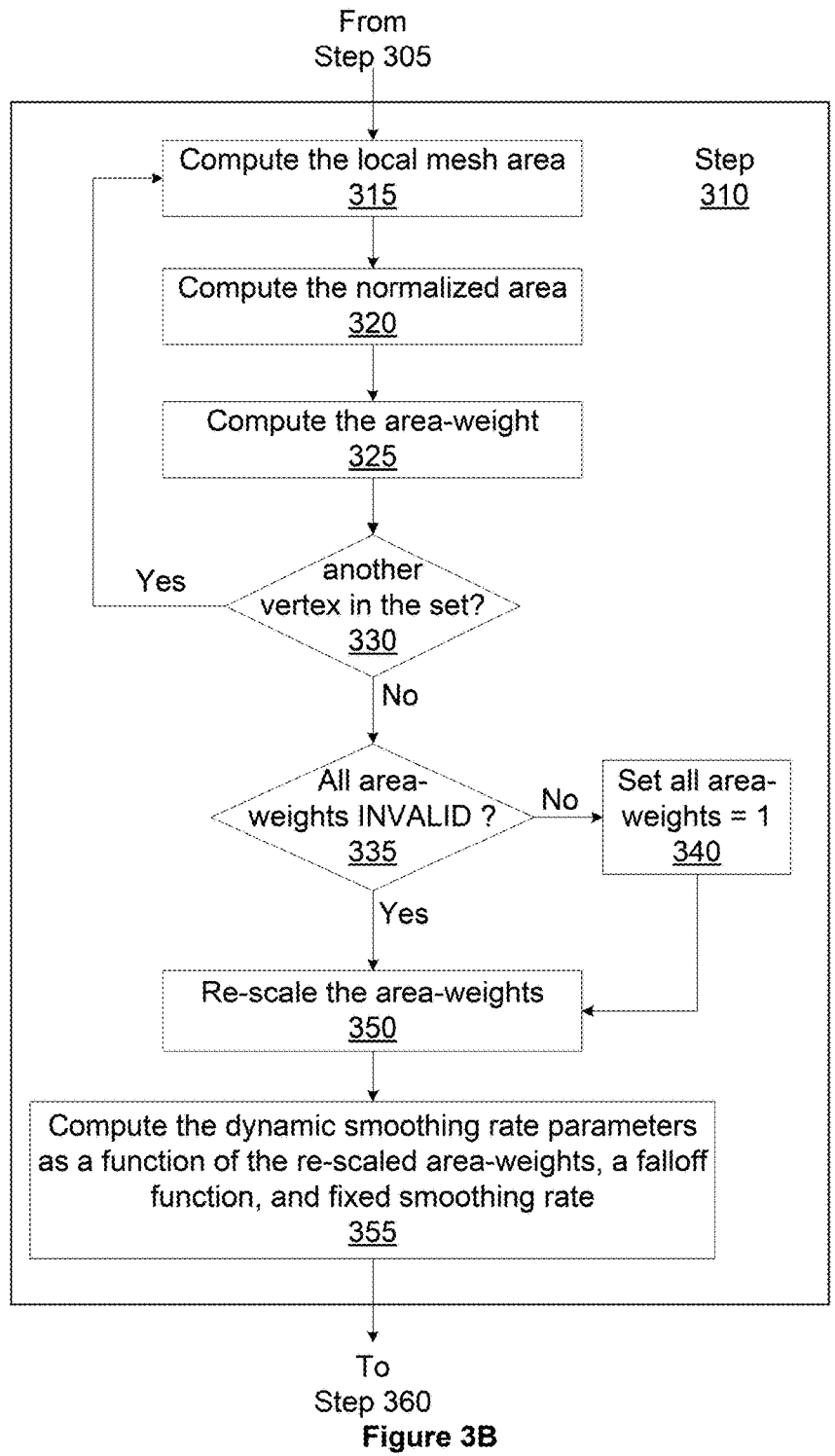
FIG. 3B is a flowchart of a method step shown in FIG. 3A for computing the dynamic smoothing rate parameters, according to one example embodiment of the present disclosure.

FIG. 3B is a flowchart of method step 310 shown in FIG. 3A for computing the dynamic smoothing rate parameters, according to one example embodiment of the present disclosure. Persons skilled in the art will understand that any system configured to perform the method steps, in any order, is within the scope of the disclosure.

The method 300 begins at step 315, where the application program that is configured to provide the resolution-adaptive mesh smoothing brush computes the local mesh area (A) when the resolution-adaptive mesh smoothing brush is applied to a 3D mesh. In one embodiment, the local mesh area is computed as the area of the polygons defined by the current vertex $V_i$ and one-ring of the current vertex. In other words, the local mesh area is the area bounded by the one-ring of vertices that are each directly connected to the vertex by an edge. At step 320 the application program computes the normalized local mesh area for the current vertex, A'. In one embodiment A'=NR, where R is the size of the resolution-adaptive mesh smoothing brush, e.g., $\pi r^2$ (r is the radius of the resolution-adaptive mesh smoothing brush). At step 325 the application program computes the area-weight, $a_i$ for the current vertex based on the normalized local mesh area, such that $a_i$=1/A', i.e., the area-weight is the reciprocal of the normalized local mesh area. If the computed area-weight is not finite, then the application program sets the area-weights to a predetermined value indicating that the area-weight is INVALID before proceeding to step 330. At step 330 the application program determines if an area-weight should be computed for another vertex in the set of vertices, and, if so, then the application program returns to step 315.

Otherwise, at step 335 the application program determines if all of the area-weights computed for the vertices in the set of vertices are INVALID. If all of the area-weights are INVALID, then at step 340 the application program sets the values of all area-weights to one before proceeding to step 350. All of the area-weights being INVALID indicates that the vertices are degenerate and the degenerate case should be handled as a special case. Therefore, the area-weights are set to a predetermined value of one when the vertices are degenerate. If at least one of the area-weights is not INVALID, then the application program proceeds directly to step 350 from step 335. Note that when none of the area-weights computed for the vertices in the set are valid, all of the area-weights are set to a value of one.

At step 350 the application program re-scales the area-weights. The re-scaling is based on a factor T which indicates the largest area weight filtered for outliers of the area-weights. In one embodiment, T is half of the sum of the average of all of the area-weights for the set of vertices, avg($a_i$) and the maximum area-weight for the set of vertices, max($a_i$), ie T=0.5*(max($a_i$)+avg($a_i$)). When an area-weight for a vertex is INVALID, the re-scaled area-weight is computed as avg($a_i$) divided by T. In other words, if $a_i$=INVALID, set $a_i$=avg($a_i$)/T. When an area-weight for a vertex is not INVALID, the re-scaled area-weight is computed as the area-weight divided by T and then clamped to a range between zero and one, inclusive, i.e., $a_i$=clamp($a_i$/T, 0, 1).

At step 355 the dynamic smoothing rate parameters for each vertex in the set are computed as a function of the re-scaled area-weights, the function, falloff($V_i$), and the fixed smoothing rate ($k_{smooth}$). In one embodiment, $k_i$=falloff($V_i$) *$k_{smooth}$*$a_i$. The dynamic smoothing rate parameters are then used to update the vertex positions by first computing a uniform-weighted one-ring centroid, $C_i$ for each vertex. Then an updated vertex position $V_i$' is computed as $V_i+k_i*(C_i'-V_i)$ for each vertex in the set, where $V_i$ is the current position of the vertex.

System Overview

Figure 4:
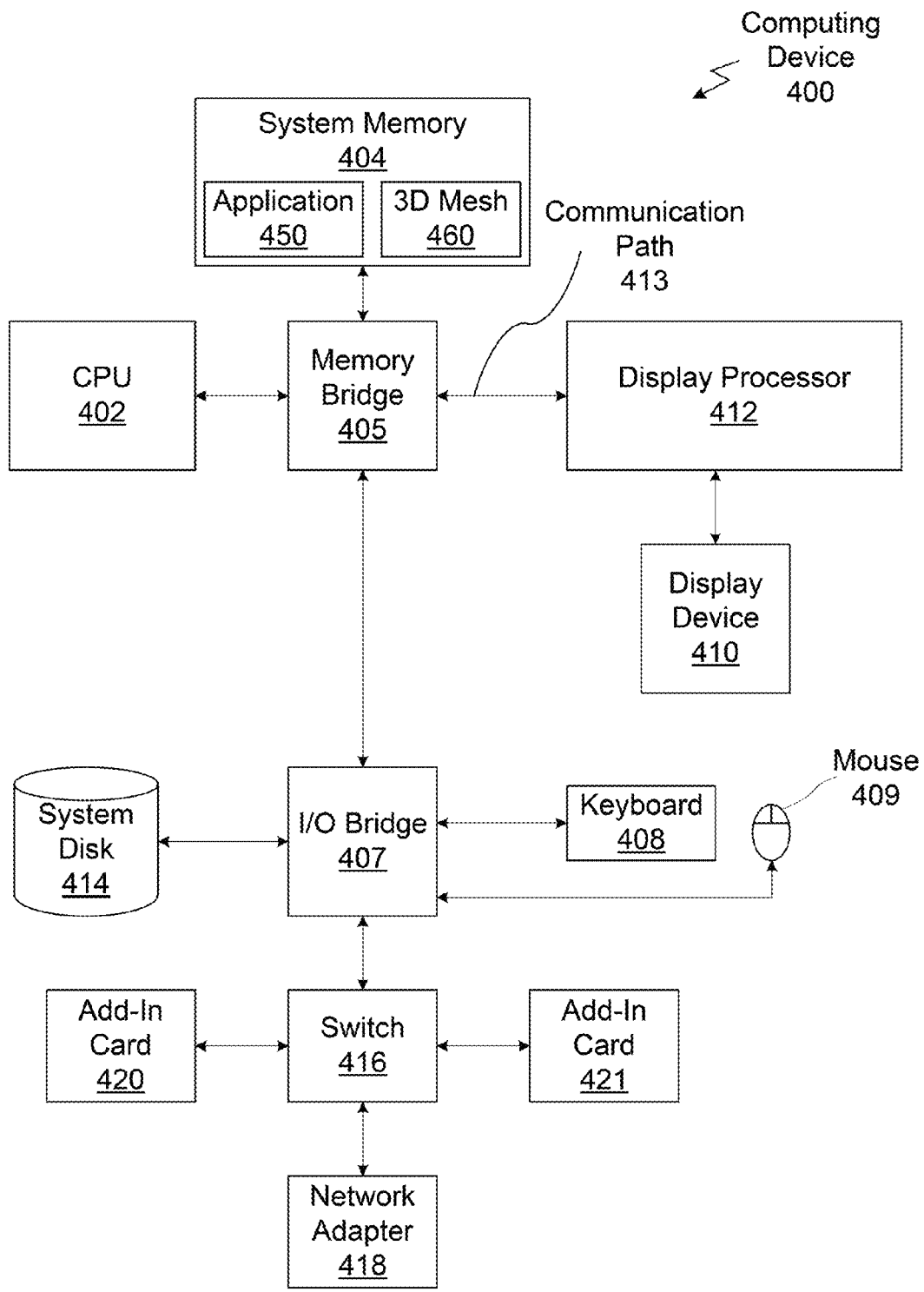
FIG. 4 is a block diagram of a computing device configured to implement one or more aspects of the present disclosure.

FIG. 4 is a block diagram of a computing device 400 configured to implement one or more aspects of the present disclosure. The computing device 400 may be configured to perform the method steps 300. In particular, an application 450 may be configured to apply the resolution-adaptive mesh smoothing brush to a 3D mesh 460, thereby performing one or more of the method steps 300.

Computing device 400 may be a computer workstation, personal computer, or any other device suitable for practicing one or more embodiments of the present invention. As shown, computing device 400 includes one or more processing units, such as central processing unit (CPU) 402, and a system memory 404 communicating via a bus path that may include a memory bridge 405. CPU 402 includes one or more processing cores, and, in operation, CPU 402 is the master processor of computing device 400, controlling and coordinating operations of other system components. System memory 404 stores software applications and data for execution or processing by CPU 402. CPU 402 runs software applications and optionally an operating system. Memory bridge 405, which may be, e.g., a Northbridge chip, is connected via a bus or other communication path (e.g., a HyperTransport link) to an I/O (input/output) bridge 407. I/O bridge 407, which may be, e.g., a Southbridge chip, receives user input from one or more user input devices such as keyboard 408 or mouse 409 and forwards the input to CPU 402 via memory bridge 405. In alternative embodiments, I/O bridge 407 may also be connected to other input devices such as a joystick, digitizer tablets, touch pads, touch screens, still or video cameras, motion sensors, and/or microphones (not shown).

One or more display processors, such as display processor 412, are coupled to memory bridge 405 via a bus or other communication path 413 (e.g., a PCI Express, Accelerated Graphics Port, or HyperTransport link); in one embodiment display processor 412 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 404. Display processor 412 periodically delivers pixels to a display device 410 that may be any conventional cathode ray tube, liquid crystal display, light-emitting diode display, or the like. Display processor 412 may be configured to provide display device 410 with either an analog signal or a digital signal.

A system disk 414 is also connected to I/O bridge 407 and may be configured to store content and applications and data for use by CPU 402 and display processor 412. System disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 416 provides connections between I/O bridge 407 and other components such as a network adapter 418 and various add-in cards 420 and 421. Network adapter 418 allows computing device 400 to communicate with other systems via an electronic communications network, and may include wired or wireless communication over local area networks and wide area networks such as the Internet.

Other components (not shown), including USB or other port connections, film recording devices, and the like, may also be connected to I/O bridge 407. For example, an audio processor may be used to generate analog or digital audio output from instructions and/or data provided by CPU 402, system memory 404, or system disk 414. Communication paths interconnecting the various components in FIG. 4 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 412 incorporates circuitry optimized for graphics and video processing, including, for example, video output circuitry, and constitutes a graphics processing unit (GPU). In another embodiment, display processor 412 incorporates circuitry optimized for general purpose processing. In yet another embodiment, display processor 412 may be integrated with one or more other system elements, such as the memory bridge 405, CPU 402, and I/O bridge 407 to form a system on chip (SoC). In still further embodiments, display processor 412 is omitted and software executed by CPU 402 performs the functions of display processor 412.

CPU 402 provides display processor 412 with data and/or instructions defining the desired output images, from which display processor 412 generates the pixel data of one or more output images. The data and/or instructions defining the desired output images can be stored in system memory 404 or a graphics memory within display processor 412. In one embodiment, display processor 412 includes 3D rendering capabilities for generating pixel data for output images from instructions and data defining the geometry, lighting, shading, texturing, motion, and/or camera parameters for a scene. Display processor 412 can further include one or more programmable execution units capable of executing shader programs, tone mapping programs, and the like.

In one embodiment, application 450 and 3D mesh 460 are stored in system memory 404. Application 450 may be a CAD (computer aided design) application program configured to generate and display graphics data included in 3D mesh 460 on display device 410. For example, 3D mesh 460 could define one or more graphics objects that represent a 3D model of a house designed using the CAD system or a character for an animation application program. One example of application 450 is Autodesk® AutoCAD® software.

It will be appreciated that the computing device shown herein is illustrative and that variations and modifications are possible. The connection topology, including the number and arrangement of bridges, may be modified as desired. For instance, in some embodiments, system memory 404 may be connected to CPU 402 directly rather than through a bridge, and other devices may communicate with system memory 404 via memory bridge 405 and CPU 402. In other alternative topologies display processor 412 may be connected to I/O bridge 407 or directly to CPU 402, rather than to memory bridge 405. In still other embodiments, I/O bridge 407 and memory bridge 405 may be integrated in a single chip. In addition, the particular components shown herein are optional. For instance, any number of add-in cards or peripheral devices might be supported. In some embodiments, switch 416 is eliminated, and network adapter 418 and add-in cards 420, 421 connect directly to I/O bridge 407.

In sum, the present application describes a system and method for smoothing a 3D mesh using a resolution-adaptive mesh smoothing brush. An advantage of the disclosed approach is that the resolution-adaptive mesh smoothing brush can be applied to a 3D mesh to smooth the mesh based on the local vertex resolution. Another advantage is that the computations needed to implement the resolution-adaptive mesh smoothing brush may be performed in real-time. Therefore, the user is provided with appropriate real-time visual feedback that enables a user to perform smoothing operations while viewing the results of the smoothing operations.

While the foregoing is directed to certain example embodiments, other and further embodiments may be devised without departing from the basic scope thereof. For example, aspects of the embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the aforementioned functions, are included as example embodiments.

In view of the foregoing, the scope of the present disclosure is determined by the claims that follow.

What is claimed is:

1. A method for smoothing a three-dimensional (3D) mesh, the method comprising:
    identifying a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush;
    for each vertex in the set of vertices, computing a dynamic smoothing rate parameter based on the vertex density that is local to the vertex; and
    for each vertex in the set of vertices, updating a position associated with the vertex according to the dynamic smoothing rate parameter computed for the vertex.

2. The method of claim 1, wherein computing the dynamic smoothing rate parameter comprises:
    for each vertex in the set of vertices, computing a local mesh area for the vertex as an area bounded by a one-ring group of vertices that are each directly connected to the vertex by an edge; and
    for each vertex in the set of vertices, normalizing the local mesh area using the brush area.

3. The method of claim 2, further comprising, for each vertex, computing an area-weight as a reciprocal of the normalized local mesh area computed for the vertex.

4. The method of claim 3, further comprising setting the values of all area-weights to one when none of the area-weights are valid.

5. The method of claim 3, further comprising re-scaling the area-weights based on a maximum area-weight associated with the area-weights and an average area-weight associated with the area-weights.

6. The method of claim 5, further comprising clamping the re-scaled area-weights to values between zero and one, inclusive.

7. The method of claim 1, wherein updating the position of the vertex is based on a falloff function that defines how strongly the resolution-adaptive mesh smoothing brush affects the vertex and that is specified for the resolution-adaptive mesh smoothing brush.

8. The method of claim 1, wherein updating the position of the vertex is based on a fixed smoothing rate parameter specified for the resolution-adaptive mesh smoothing brush.

9. A non-transitory computer-readable storage medium containing a program for smoothing a three-dimensional (3D) mesh, which, when executed by a processing unit, cause a computer system to perform an operation comprising:
    identifying a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush;
    for each vertex in the set of vertices, computing a dynamic smoothing rate parameter based on the vertex density that is local to the vertex; and
    for each vertex in the set of vertices, updating a position of the vertex according to the dynamic smoothing rate parameter computed for the vertex.

10. The non-transitory computer-readable storage medium of claim 9, wherein the computing of the dynamic smoothing rate parameter comprises:
    for each vertex in the set of vertices, computing a local mesh area for the vertex as an area bounded by a one-ring group of vertices that are each directly connected to the vertex by an edge; and
    for each vertex in the set of vertices, normalizing the local mesh area using the brush area.

11. The non-transitory computer-readable storage medium of claim 10, further comprising, for each vertex, computing an area-weight as a reciprocal of the normalized local mesh area computed for the vertex.

12. The non-transitory computer-readable storage medium of claim 11, further comprising setting the values of all area-weights to one when none of the area-weights are valid.

13. The non-transitory computer-readable storage medium of claim 11, further comprising re-scaling the area-weights based on a maximum area-weight associated with the area-weights and an average area-weight associated with the area-weights.

14. The non-transitory computer-readable storage medium of claim 13, further comprising clamping the re-scaled area-weights to values between zero and one, inclusive.

15. The non-transitory computer-readable storage medium of claim 9, wherein updating the position of the vertex is based on a function falloff and that is specified for the resolution-adaptive mesh smoothing brush.

16. A system for smoothing a three-dimensional (3D) mesh, the system comprising:
    a processor; and
    a memory coupled to the processor, wherein the memory includes an application program that includes instructions that, when executed by the processor, cause the processor to:
        identify a set of vertices within an area of the 3D mesh that is operated on by a resolution-adaptive mesh smoothing brush that is configured to smooth the 3D mesh based on a vertex density of a region of the 3D mesh within a brush area of the resolution-adaptive mesh smoothing brush;
        for each vertex in the set of vertices, compute a dynamic smoothing rate parameter based on the vertex density that is local to the vertex; and
        for each vertex in the set of vertices, update a position of the vertex according to the dynamic smoothing rate parameter computed for the vertex.

17. The system of claim 16, wherein the application program is further configured to:
  for each vertex in the set of vertices, compute a local mesh area for the vertex as an area bounded by a one-ring group of vertices that are each directly connected to the vertex by an edge; and
  for each vertex in the set of vertices, normalize the local mesh area using the brush area.

18. The system of claim 17, wherein the application program is further configured to, for each vertex, compute an area-weight as a reciprocal of the normalized local mesh area computed for the vertex.

19. The system of claim 16, further comprising a display device configured to display the 3D mesh, a graphical representation of the resolution-adaptive mesh smoothing brush, and the smoothed 3D mesh.

* * * * *